March 31, 1936.  W. I. KASER  2,035,705
FORAGE CROP GATHERING IMPLEMENT
Filed Feb. 4, 1935  4 Sheets-Sheet 1

Inventor
WALTER I. KASER
Frank D. Gray
By
Attorney

Inventor
WALTER I KASER
Frank D. Gray
By
Attorney

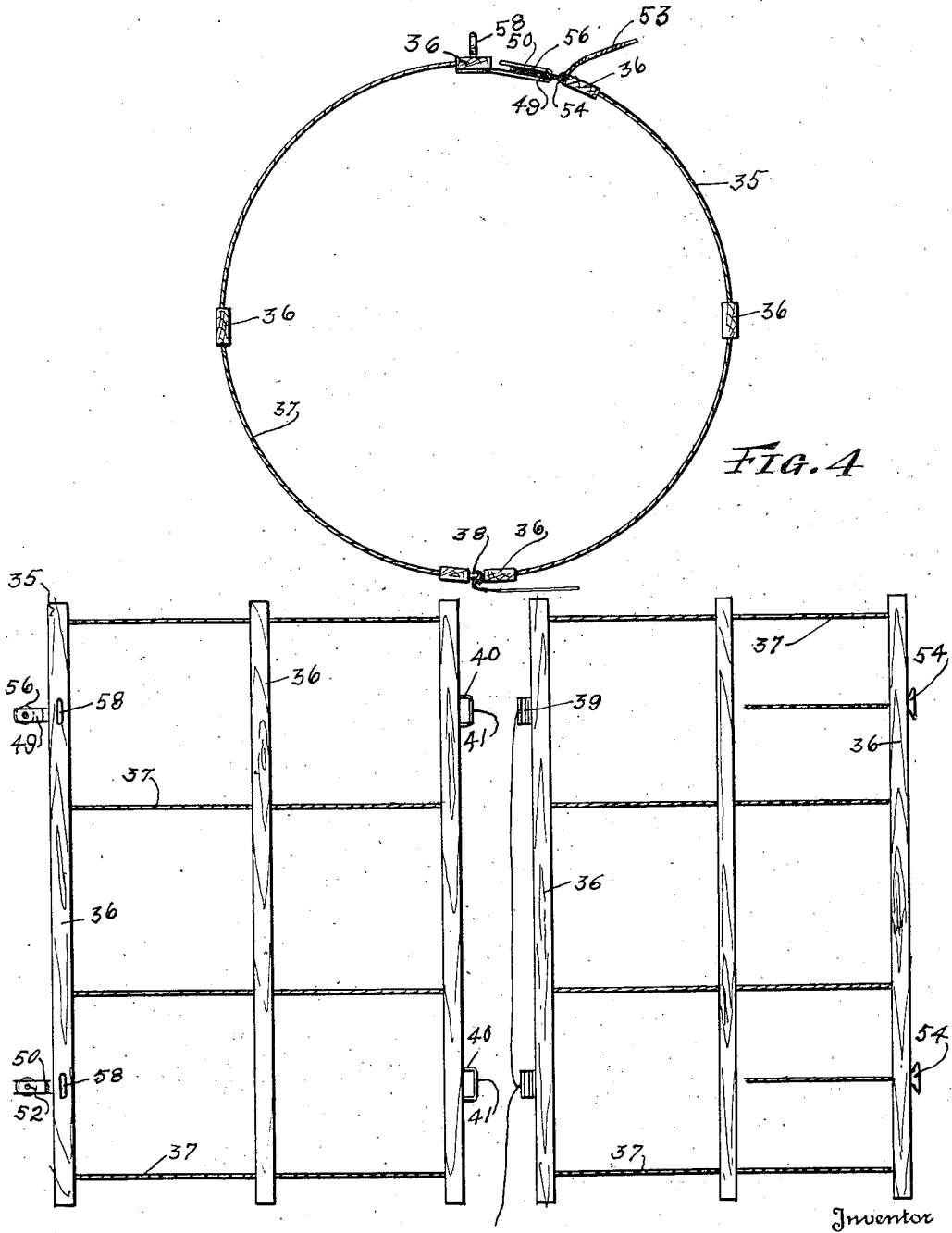

March 31, 1936.  W. I. KASER  2,035,705

FORAGE CROP GATHERING IMPLEMENT

Filed Feb. 4, 1935    4 Sheets-Sheet 4

Inventor
WALTER I. KASER
By Frank D. Gray
Attorney

Patented Mar. 31, 1936

2,035,705

UNITED STATES PATENT OFFICE 2,035,705

FORAGE CROP GATHERING IMPLEMENT

Walter I. Kaser, Clark Township, Holmes County, Ohio, assignor of one-half to Joseph F. Glidden, Lakewood, Ohio Application February 4, 1935, Serial No. 4,752

10 Claims. (Cl. 56—341)

My invention relates to improvements in forage crop gathering implements, and has particular reference to such improved implements which are adapted to use in handling various forage crops, both in readily gathering the material to be harvested into bundles preparatory to convey the latter up to and upon a suitable vehicle such as a truck or wagon usually provided with a rack or other form of holder to receive the gathered material thereon; and a further use of such mechanism may be subsequently made which will unload the material from the vehicle and serve in a similar manner to conveniently transfer such material to a suitable support for the latter, either under roof or to a base for a stack which is built up by successive operations of the conveyor.

My improved implement hereinafter to be described in greater detail, is more or less composite, to include a conveyor for gathering the material at the lower level where found ready for such operation, and raising the same in bundles which will be later explained as units such as slings, a frame having means for assembling adjacent the truck for carrying the said units when dropped into the truck, a crane together with suitable frame construction near said truck, whereby the several slings may be raised and swung over the truck, as above stated, the crane including therein an arm having hooks adapted for grasping the material holders or slings to raise the same prior to swinging into the position where the material is to be dropped in one place for deposit, or outwardly for lowering for grasping other units of material prior to swinging again over the vehicle to carry the total load to be transferred to the final base therefor.

It is not therefore, my purpose to merely provide a hay loader of the usual type, though some parts of my composite implement includes some well-known features of the hay-loader type to be drawn at the rear of the truck or wagon and designed primarily to convey the material such as hay, from the ground to a position over the wagon upon which the material is loosely dropped from the overhanging arm of the loader. My device embodies all the essential mechanism of the usual loader, but also further attains a very desirable function of raising the material while in one position of the swinging arm, and depositing the material when said arm is in a more desirable position relative to the length of the vehicle used.

It is a further object of my implement to position the conveying mechanism including the swinging crane for carrying the material from one side of the truck to a position directly over the truck, this use of the crane as described no longer making the trailing of the device at the rear desirable.

It is a further object of my present invention to make the grasping action of the mechanism for handling the particular material to be gathered, more positive and certain, so that little will be lost in the operation of gathering. To this end the material is initially gathered in slings which provide units more readily grasped by the hook mechanism mentioned.

A still further object of my improvement lies in the use of tractor power included in the crane mechanism for operating the conveyor unit and including suitable clutch mechanism for opening and closing the members for controlling the operation of the power units, certain manual devices being provided for releasing the hooks or kindred mechanism at the proper time when the hooks of the crane arm are in the desired position.

With these and other objects in view, the invention consists in the parts, and combinations hereinafter stated and claimed, together with the operation and functions of the disclosed structure hereinafter illustrated and described, in connection with the drawings in which:—

Figure 4 is a detail end elevation of the sling and showing certain releasable latches.

Figure 5 is a plan view of the sectional sling;

My crop gathering implement is constructed as a vehicle usually mounted on a low frame 5 from which vertical standard members rise for operating various mechanisms connected therewith, and some of them related in their functions with each other, as will later be explained. This machine for crop gathering is often used in conjunction with a wagon or truck having a carrying rack, but not necessarily mechanically connected with such truck or other transfer vehicle.

Figure 1:
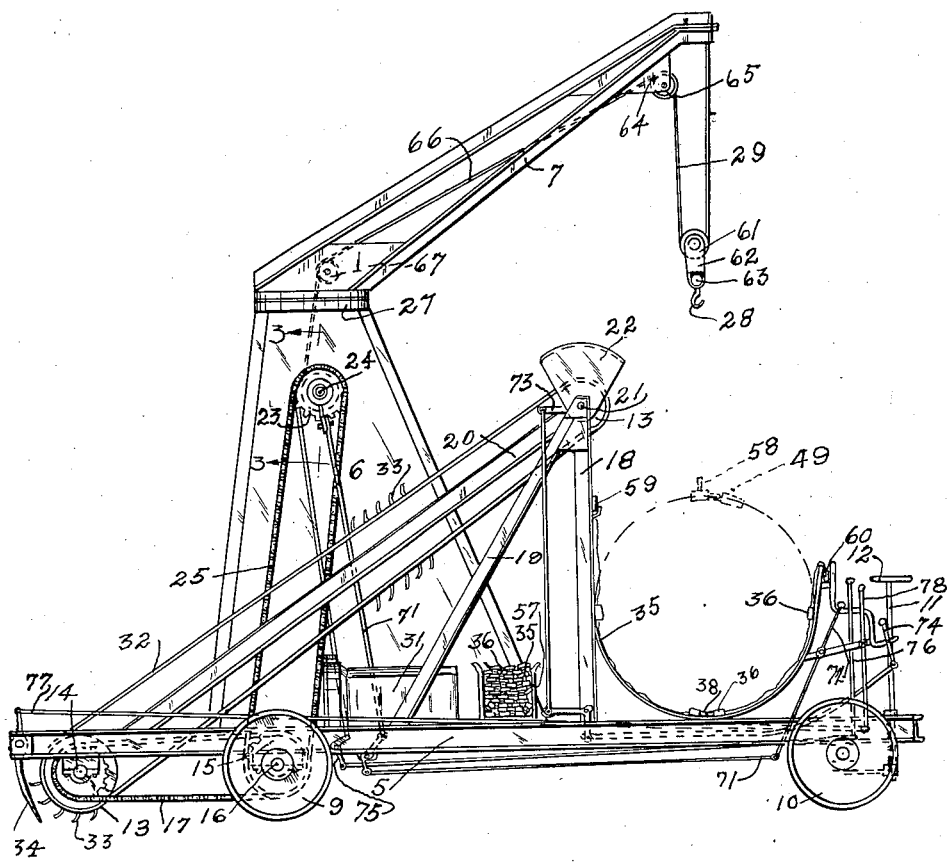
Figure 1 is a side elevation of my crop gathering implement.

The gathering mechanism here shown mounted on the frame 5 will preferably include a vertical support 6, a swinging crane 7 pivoted on a vertical axis 8, rear wheels 9 more often tractors for moving the vehicle as a unit, front wheels 10 operating as a steering truck operating in any conventional manner by a vertical shaft 11 with steering wheel 12. At the rear of the wheels 9 and spaced therefrom, is a rotatable drum 13 mounted beneath the longitudinal sill of the frame 5 upon the axle 14, the drum 13 being driven from a sprocket 15 on the axle shaft 16 of the wheels 9 by the sprocket chain 17, as shown in Fig. 1.

The vertical post 18 braced by the inclined bars 19 and 20, serves to mount a transverse pivotal shaft 21 carrying a swinging bail member 22 whose function will be described in detail later. A sprocket 23 pivoted on a cross shaft 24 mounted on the support 6, may receive power from shaft 16 coaxial with wheels 9, by suitable sprocket and chain 25.

Figure 2:
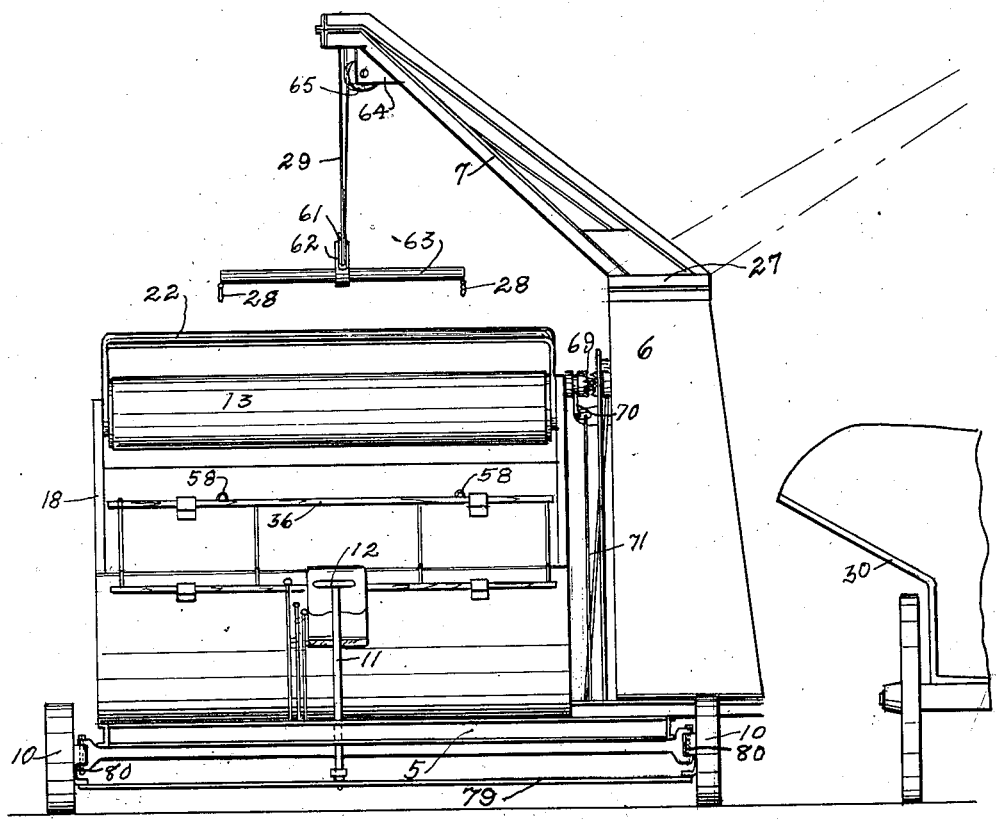
Figure 2 is a front elevation of my gathering implement in position as related to a transfer vehicle, and showing two positions of the crane arm in operation.

The crane 7 is efficiently pivoted upon the support 6 by ball bearings 26 provided with conventional disc plates 27 permitting swinging of the crane on a vertical axis to position the suspended hook 28 by wire or rope 29 directly over the tractor carrying the crane, or when desired, to a position over the truck 30, shown in Fig. 2 as a vehicle having a rack for receiving thereon the material originally assembled on the said tractor. The shaft 16 may well be considered the main shaft from which other parts are driven as needed, it being somewhat immaterial what power is made use of for energizing said shaft. I have however, indicated in Fig. 1, a motor 31 intended to represent the power source, no particular gearing connections therefrom to other mechanisms being shown or claimed in this case.

It is the function of this machine to afford a very greatly improved means for raking up crop material from the ground surface, roll it up in approximately cylindrical bundles, convey the bundles after rolling to a height of at least above the normal uppermost level of the rack of the usual farm wagon; and this combined operation includes two initial operations, the rolling or winding up of the bundles being performed at the ground surface, and the raising of the bundles accomplished then by suitable conveyor mechanism. The latter will be referred to as the carrier 32 which is endless and supported upon the end drums 13 of which the lower one is mounted on shaft 14, and the upper one upon the shaft 21 at the top of the standard 18.

This carrier 32 is provided with a plurality of spaced sets of relatively long teeth 33 slightly spaced from each other on the outer surface of the carrier which is web shape and driven preferably from the lower drum 13. The teeth 33 are somewhat hook-shaped all of which are pointed forward of the movement of the web surface. In Fig. 1, one set of such teeth is shown as they travel about the lower drum 13.

The carrier teeth 33 are arranged in spaced sets on the conveyor 32 whereby their contact with the forage material at the lower drum 13 will be intermittent, each gathered bundle at that drum being caught there by a set of teeth 33 after said drum has held the material by rotations unhindered, until the next set of teeth reaches said drum. After this action upon the forage is completed, and the latter carried up to the upper drum 13 upon the standard 18, further rotation of the lower drum 13 on the shaft 14 will tend to accumulate a new bundle to be caught in turn by the next set of teeth. Just at the rear of the lower drum 13 a rake element 34 is mounted by suspension from the said frame 5, such element comprising transversely spaced teeth which are stationary and spaced rearwardly of the drum 13 to permit the teeth 33 on the carrier 32 to pass between the drum and the rake 34. This rake element therefore, serves to gather the material on the ground surface adjacent the drum, until sufficient such material has been raked for efficient action by the carrier teeth.

For purpose of convenient description, the rotation of said carrier 32, the operating chain and hook 28, as well as driving operation of the gathering implement as a whole, is being referred to as motor driven, as from a motor 31, the term being used generically only; but it is not intended by applicant that said description or any of the claims herein, shall be limited to such motor driving mechanism, but that whenever desirable, the said implement shown as a vehicle, may be drawn by horses by proper connections such as a conventional clevis not shown or claimed in this case. The rear tractor wheels 9 may be used in either case as driving means for the main shaft 16, as before mentioned. It is to be understood that the bail member 22 is actuated to swing on its shaft 21 by suitable connections and gearing not shown nor described in detail. The function of said bab is delivering the bundles over the drum 13. When desired, the bail may retard material on the carrier.

The gathered material accumulated by the rake 34 while the smooth web of the carrier 32 only is traveling over the drums 13, remains below the frame 5 until the set of teeth 33 passes between the drum 13 and the rake 34, after which the bundled material is carried upward over the upper strand of the member 32 until the bail is reached where the latter swings upon the shaft 21 clockwise until the bundle drops, aided by gravity, downward upon the floor of the frame 5, in front of the standard 18. This delivered position of the bundle is shown in Fig. 1, as one ready for baling which latter operation will now be described. This baling is performed for a temporary purpose to hold the material in positive form while being handled for suitable loading movements which may deliver the bundles up to and upon the truck or rack of the latter. A similar operation occurs when the bundles of material are lifted from the rack and delivered therefrom to a stack or other base. It will be understood however, that the gatherer shown in Fig. 1, may remain in a field of limited area while the vehicle 30 carries each load to a particular base for deposit.

For baling purposes a plurality of bundling devices or slings 35 are provided each of which comprises a plurality of widely spaced wooden bars 36 which in use will be positioned in paralellism, as shown in Fig. 5, each sling comprising preferably two or more sections, with three such bars 36 in each section. The several bars of each section are best connected by spaced ropes or chains 37 whereby an enclosure or bundle of gathered material may be formed by winding the highly flexible cords 37 together and fastening the sections at proper intervals, as shown in Figs. 4 and 5. Such bales are shown in position in Fig. 1.

Figure 8:
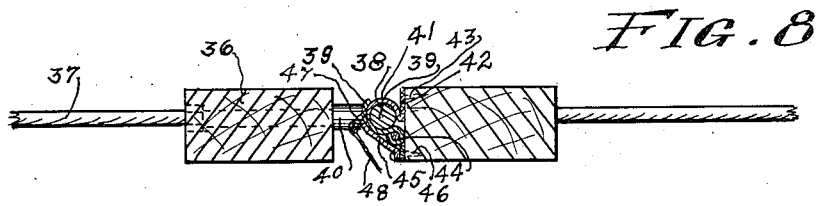
Figure 8 is a transverse section taken in the plane indicated by the line 8—8 of Fig. 7.
Figure 7:
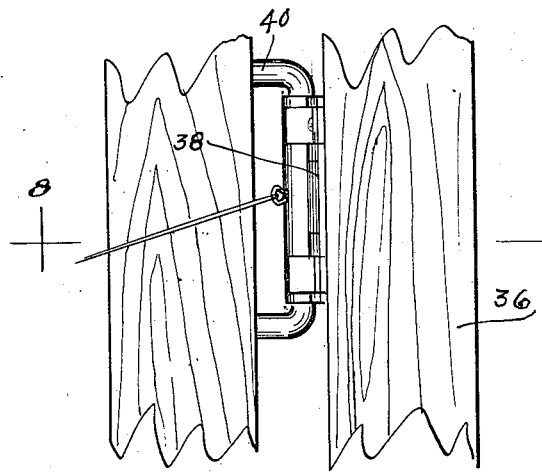
Figure 7 is an inverted plan of a releasing hinge or grab hook.

The two sections are shown in Fig. 5 as connected together with a releasable or a plurality of releasable latches 38 comprising hook shape members 39 arranged in pairs as shown in Figs. 7 and 8.

Referring more especially to Figs. 4 and 5 of the drawings, the before-mentioned latches 38 form a hinge structure to permit pivoting of the sections of the slings employed for baling the material, and are readily positioned at the lower points of the sling, so that the upper edges of the sling sections may be manually drawn together, and there quite securely, though temporarily fastened, until it is desirable to open the sling and release the material of the bale. The latter operation is performed most conveniently by releasing the hooks 39 of the latches which also function as a hinge, as above explained. Such release of the hooks 39 is made very practicable by pivoting the said hooks 39 upon a bar 36 of a given section, in pairs adapted to swing toward each other to closing position, the corresponding opposite section having metal staples or loops 40 having an intermediate portion relatively straight as at 41, and positioned on the section for engaging the said hooks 39, which latter grasp such portion 41 which may therefore, be termed a bolt, and so shown in Figs. 7 and 8.

Of said latches 38, one hook of the pair is made integral with a base flange 42 which is fastened to its bar 36 by screws 43 or other fastenings. But the companion hook is pivoted at 44 to a metal flange similarly secured to the bar. A thin and elongated plate member 45 is also secured to the bar 36 by a screw 46, such member being normally spring-pressed against the swinging hook 44 to close the hooks about the said bolt 41, as shown in Fig. 8. An eye 47 on the remote edge of the member 45 permits attachment thereto of a cord or cable 48 whose pulling strain will release said spring-pressure from the hook 44 and open the latch.

At the upper portion of the sling 35 as shown in Figs. 1 and 4, a fastening device 49 is provided for securing the edges of the sling 35 together after sufficient material has been enclosed by the sling members to require baling for handling.

When the slings 35 are open and unfastened, before material is brought to them, the two sections of each sling may be laid out flat and the sections fastened first together by fitting the hooks 38 and 39 about the corresponding bolt 41 of the opposite bar 36 on the other section, as shown in Figs. 4 and 8. The spring plate 45 will then hold the latch members normally in position until released by pulling the cable 48. The fastening device 49 shown in Figs. 1, 4 and 6, comprises two parts—a metal holder 50 attached to one bar 36 of one section by rivets 51 while the opposite end of the holder is bent to return toward the bar to provide alined openings 52 for receiving a pivot pin for mounting a pulley 56 thereon for receiving a pulley cord 53. The other part of the device 49 comprises a wedge block 54 secured to the bar 36 of the opposite section, a rope 53 is secured at one end to the bar at 55 while the other end of 53 is threaded about the pulley 56 and may then be wound in secure position about the block 54. Unwinding the cord 53 will readily loosen the device 49.

The several slings 35 may be very loosely supported in an elongated receptacle as shown in Fig. 1 at 57, when such slings are unattached with each other or not assembled in position for enclosing material therein and holding the latter in bales, as indicated in Fig. 1 in a preparatory position in full lines. In such preparatory position, the provision of spaced staples 58 upon the outer of one section of a sling 35, enables supporting the edge of said section upon the standard 18 at 59 until baling is about to be begun.

The edge of the companion section of a given sling is then temporarily suspended from a support 60 nearer the steering wheel 12, but the loop formed by the cord 53 attached to the block 54, may be held on such support, until the mass material is permitted by the bail 22 to fall downward into the open sling thus shown.

Figure 6:
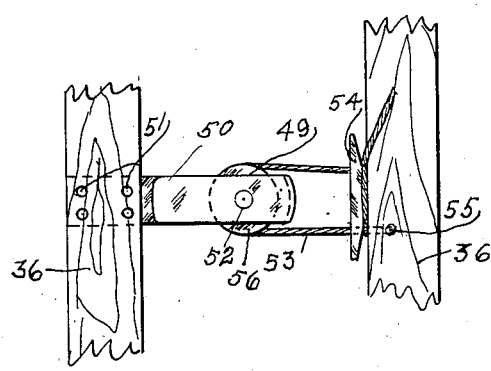
Figure 6 is a detail plan view of a latch for fastening detachably the ends of a loop about the sling.

The bail 22 is pivoted upon shaft 21 for oscillation from its uppermost position shown in Fig. 1, in a small arc over to a position closely adjacent the standard 18 where the conveyed material carried upward on the web 32 rolls over into the grasp of such sling whose ends are held open to receive the material, and where the ends bearing the parts of the fastener 49 are brought together as shown in broken lines in Fig. 1. Such ends are then secured as shown in Fig. 6, and as heretofore explained. In this baled condition, the staples 58 in the bar 36, as shown well in Fig. 4, serve the purpose of providing means for connecting the hooks 28 therein for raising the entire bale when the latter is to be loaded and transferred to a rack or stack, as may be.

Figure 3:
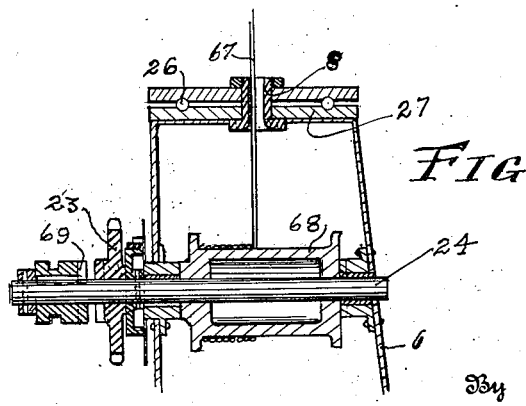
Figure 3 is a fragmentary detail sectional view of a brake drum employed with a clutch structure associated therewith, the section being taken in the plane indicated by the line 3—3 of Fig. 1.

The hooks 28 are suspended from the cables 29 by means of a pulley 61 carried by said cables, and the block 62 carrying a transverse bar 63 bearing a hook 28 at each end thereof. This structure enables the attachment of two staples 58 on the bar of a sling by a single bar 63 and actuated by a single pulley. The arm 7 includes a bracing plate member 64 beneath the upper end of the arm, and which member bears a vertical pulley 65 over which a strand 66 of 29 rides and is guided toward the disc bearing 27 for the arm, and is there carried over the pulley 67 from which the strand 66 leads to a winding reel or drum 68 which exerts pulling power on the strand when the clutch 69 is closed, but which may be opened, as shown in Fig. 3, when driving of the reel is not desired.

The clutch 69 is controlled by the bell crank 70, as shown in Fig. 2, connections being provided at 71 for enabling control by lever 72 adjacent the wheel 12. Power is received by the gear 23 from sprocket chain 25, as indicated. The bail 22 is best held in the upright position when the material is not to be driven over the drum 13 and dropped into an open sling 35. The bail is controlled by the bell crank 73 from lever 74.

A brake mechanism of conventional character, not claimed in this case, is provided to make more positive the control of the winding reel 68, and may be connected by bell crank 75 with lever 76. The rake teeth 34 may be operated by rods 77 from the lever 78, when desirable. The shaft 11 for steering the wheels 10, operates the common link 79 which may swing the steering wheels on the vertical pivots 80, as shown in Fig. 2. Such steering mechanism may or may not be used, depending upon whether motor or horsepower is used for traction. The operation of the baling mechanism and the crane, as well as the rake and conveyor belt having the spaced sets of teeth 33, does not depend in any sense upon the character of traction employed. It is to be noted that the standard 6 is mounted in a position somewhat offset laterally from the conveyor mechanism and its associated structure, thereby making feasible by its intermediate position, a better swinging operation of the crane 7 from the position over the bale when the sling is fastened over the latter, to that shown in dotted lines, over the rack on the truck 30.

Operation: The truck 30 will be positioned at a point in or adjacent the area from which the material is to be gathered, and the gathering implement carrying the crane, rake and conveyor will move over the surface of the ground upon which the crop material has been cut, raking up such material at 34, while the hooks 28 are raised to a position somewhat higher than the bail 22. The latter will now be held in the upper position as shown in Fig. 1 to prevent carrying the material over until a loose sling is taken by the operative from the receptacle 57 and opened to permit the end bars of the sling 35 to be fastened in such open position at 59 and 60 respectively. The bail 22 is then swung down by operating lever 74 to permit material on carrier 32 carried up by a set of teeth 33, to drop into such open sling.

The rake 34 operates to accumulate material between drum and rake until the next set of carrier teeth 33 reaches that point, when the material there is caught up by that set, as shown in Fig. 1, and advanced forward on the upper strand of the conveyor 32 to the drum 13 over which the bail swings as before explained. When sufficient material has accumulated in the sling 35 as shown in such view, the bail is swung up by lever 74 to prevent carrying of material over the upper drum while the sling is being baled. The latter operation is performed by manually bringing the ends of the sling together and fastening them by placing the rope 53 over the pulley 56, and then winding the rope end about the wedge blocks 54 (several such fasteners may be employed) as shown in Fig. 5. The cable 29 may now be unwound sufficiently to lower the hooks 28 into engaging position in the staples 58 to raise the baled material bodily upward by winding the rope on the reel 68, as shown in Fig. 3.

The arm of the crane 7 is then swung on a vertical axis to bring the bale over the rack of the truck 30 where, the rope designated by numeral 48 is readily given a strong pull which releases the spring 45 and thereby opens the latch 38 to drop the material into the rack, or such sling may be retained on the bale until the place of deposit for the material, when the sling, after release from the bale, may be brought back to the receptacle 57 for use over again.

Having illustrated my invention and described the structure thereof and its operation as applied in at least one manner of adaptation to certain conditions, what I claim as my invention and desire to protect by Letters Patent is:—

1. A crop gathering implement comprising a traction driven drum, a rake of spaced teeth mounted in spaced relation to said drum and outside thereof for gathering the crop material between the rake and drum, a carrier comprising an endless web passing around said drum and adjacent said rake for engaging the material accumulated in said rake drum space and comprising thereon spaced sets of slightly spaced teeth in each set for passing through said space in sets at intervals and delivering the gathered material in bunches at the remote end of said carrier, and means for receiving the bunches from the carrier for enclosing operation for loading.

2. A crop gathering implement comprising a traction driven drum mounted on a rear end of a frame, a rake of spaced teeth mounted outside said drum and spaced therefrom for delivering the material at such intervening space, an upper and forward drum mounted for rotation, an endless carrier riding on such drums and carrying on its outer surface spaced sets of teeth for passing through the rake drum space and engaging accumulated material in the latter and delivering the material at intervals at the upper drum, and means for receiving said material in separate bunches from said sets of teeth for an enclosing operation.

3. A gathering implement comprising a traction driven drum at the rear end of a frame, a toothed rake spacedly mounted adjacent said drum, an upper and forward drum rotatably mounted, an endless carrier riding on such drums and having sets of carrier teeth spaced apart for passing through said rake drum space at intervals to engage material thereat and carry the same in separate bunches to the upper drum, and means for receiving said bunches adjacent the carrier at the upper drum, and delivering them singly by dropping each in horizontal position for enclosing operation.

4. A gathering implement comprising a traction driven drum mounted on the rear end of a frame and therebeneath, a toothed rake spacedly mounted parallel with and rearwardly of said drum, for accumulating forage material at the intervening space, an upper and forward drum rotatably mounted on a standard secured on said frame and parallel with the said rear drum, an endless carrier riding on said drums and having on its outer surface spaced sets of carrier teeth slightly spaced in the direction of the carrier, so that the smooth surface between the said sets will not positively convey the material from the rear drum to the forward drum, but will at intervals between said drums carry the accumulated material between the drum and rake to the forward drum in separate bunches, and means to swing upon the forward drum shaft for delaying movement of the material when such means is in its upper position, but movable to a lower position to drop the material from said forward drum, and manual means for controlling said rotatable means.

5. A crop gathering implement comprising a traction driven drum at the rear end of a frame, an upper and forward drum rotatably mounted above said frame, a toothed rake spacedly mounted rearward of said rear drum, frame means for suspending the ends of a flexible sling member below and forward of said upper drum detachably, a sling member having at its ends detachable pulley and block securing means for connecting together about the material in said sling member, an endless carrier riding on said drums and having teeth thereon in sets for passing between the lower drum and rake at intervals, and a bail member oscillatable about said upper drum to drop the material from the latter drum into said sling therebeneath in its open position.

6. A crop gathering implement comprising an elongated frame having front steering wheels mounted therebeneath, rear traction wheels having mechanical connections with other driven mechanism including a reeling drum mounted on a vertical standard, a swinging crane mounted on said standard for movement on a vertical axis, a forward standard having an upper drum thereon, a rotatable drum rearwardly of said first-mentioned standard, an endless conveyor riding on said upper and rear drums and having toothed means thereon for carrying material from said rear drum to the upper drum and normally dropping it beyond the latter drum, means for feeding the material upon the lower end of said conveyor, a flexible sling element having detachable ends for opening such element and attaching to hook means spaced apart to hold the sling open to receive the material as it falls from the said upper drum, means for controlling the delivery of the material over said upper drum, and means for enclosing the ends of the sling about the bale of material into which it drops from said upper drum.

7. A crop gathering implement comprising an elongated frame, a rear and a forward standard vertically mounted on said frame, parallel drums mounted on the forward standard and at the rear of the frame, respectively, a conveyor riding on said drums, the rear drum being traction driven, crane mechanism mounted on said rear standard and rotatable thereon about a vertical axis to carry a bale of material from a position on the floor of the frame forward of the forward standard, to a lateral position over a device for receiving such bale therefrom, a sling member having its ends detachably connected together for securing the material in said sling member, a latch member intermediate the ends of the sling comprising a spring latch member for holding the latch engaged, and a manually operable member for disengaging the latch when the sling may open to drop the material therefrom.

8. A crop gathering implement comprising an elongated frame having a traction driven drum at the rear end thereof, a rear and a forward standard vertically mounted on said frame, a toothed rake spacedly mounted adjacent said drum and beneath said frame, a reeling drum mounted on said rear standard, a swinging crane mounted on the latter for movement on a vertical axis, a drum mounted on the forward standard and parallel with the rear drum, carrier mechanism traveling on said rear and forward drums and having means for carrying material from the rear drum to the forward drum and normally dropping it beyond the latter, means for receiving the material in bunches adjacent the forward standard, and comprising a sling member having detachable ends to hold the sling open to receive the bunches singly, means for enclosing each bunch by uniting said ends together, mechanical means for grasping a bunch of material so enclosed and raising it suspended by the crane, and a manually operable member for disengaging the sling ends to drop the material therefrom.

9. A gathering implement comprising an elongated frame having a traction driven drum at the rear end thereof, and front steering wheels mounted beneath the frame, rear and forward vertical standards on said frame, a reeling drum mounted on the rear standard, a swinging crane mounted on the latter, a drum mounted on the forward standard and parallel with the rear drum, an endless carrier riding on such drums to engage material at the rear drum and carry the same in separate bunches to and over the upper drum, means for receiving the material in bunches adjacent the forward standard for an enclosing operation, means including a pulley and hooks for engaging and lifting the enclosed bunches or bales while suspended from the crane, means actuated by the reeling drum for operating said lifting means, driving connection between the traction driver and the reeling drum, and a manually operable member for disengaging the enclosed bales from said hook and dropping the material in said bales.

10. A gathering implement comprising a traction driven drum at the rear end of an elongated frame, a toothed rake spacedly mounted from and parallel with and adjacent to said drum, another drum mounted forward of the rear drum and on a plane above the latter, an endless carrier riding on such drums and having spaced sets of spaced teeth mounted thereon in alinement upon the carrier surface for passing through said rake drum space at intervals to engage crop material accumulated thereat in bunches by the gathering force of the rake teeth, and for conveying such bunches formed in such intermediate space upward and forward on the upper strand of the carrier to the upper drum, a swinging bail pivoted on the axis of the upper drum for oscillation from a vertical position to a lower position whereby the travel of the material bunches over the upper drum is delayed by the vertical position of the bail, but permitted to drop from the drum when the bail is lowered.

WALTER I. KASER.